June 10, 1969 T. J. VAN KESSEL 3,449,715

TRANSMITTING ARRANGEMENT FOR THE TRANSMISSION OF COMPATIBLE SINGLE SIDEBAND OSCILLATIONS

Filed March 17, 1965

INVENTOR.
THEODORUS J.V.KESSEL
BY
Frank R. Trifari
AGENT

United States Patent Office 3,449,715
Patented June 10, 1969

3,449,715
TRANSMITTING ARRANGEMENT FOR THE TRANSMISSION OF COMPATIBLE SINGLE SIDEBAND OSCILLATIONS

Theodorus Jozef van Kessel, Emmasingel, Eindhoven, Netherlands, assignor to North American Philips Company Inc., New York, N.Y., a corporation of Delaware Filed Mar. 17, 1965, Ser. No. 440,540
Claims priority, application Netherlands, Apr. 4, 1964, 6403783
Int. Cl. H04b *1/68;* H03c *1/06, 1/52*
U.S. Cl. 325—137 3 Claims

ABSTRACT OF THE DISCLOSURE

In a compatible single sideband system, the input signals are modulated on a carrier to produce a first single sideband signal, and this signal is limited and then frequency doubled. The doubled oscillations are modulated with the original signals and transmitted. The system suppresses signal components outside the desired band. Further suppression is obtained by dynamically controlling the modulation index of the signals in one of the channels connected to the input of the output modulator.

This invention relates to a transmitting system for generating and transmitting amplitude modulated oscillations of the type in which the information content is concentrated substantially in a single sideband.

In one system of this type, signals to be transmitted, such as music or speech signals, are applied to a first amplitude modulator to modulate local oscillations. The local oscillations and a single sideband output from the first modulator are applied to an amplitude limiter to produce carrier wave oscillations of substantially constant amplitude. The carrier wave oscillations thus produced are modulated in a second amplitude modulator by the music or speech signals to produce a single sideband output signal. Transmission systems of this type are disclosed, for example, in United States Patents 3,274,492 and 3,295,072.

Such transmitting arrangements may advantageously be used for broadcast purposes, since, on the one hand, the signals emitted by the transmitting arrangement may be detected in an ordinary amplitude demodulator with good quality of reproduction and, on the other hand, with the transmitting power unchanged, the emitted power of the information signals is considerably raised relative to the power of the carrier oscillation and also a considerable saving in bandwidth is obtained since the information content of the transmitted signals is concentrated substantially in one sideband. Signal components still occurring outside the relevant sideband are found still to have a comparatively great power.

An object of the invention is considerably to attenuate the frequency components located outside the relevant sideband in a very simple manner so that, in addition to considerably reducing the interaction of adjacent transmitters, the quality of reproduction is improved.

The arrangement according to the invention is characterized in that a frequency doubler is arranged between the limiter and the output modulator, followed by an output filter which passes only the signal band on twice the carrier oscillation of the signals applied to the amplitude limiter.

In order further to suppress the frequency components located outside the relevant signal band, at least one of the circuits formed respectively by the circuit leading to the limiter stage and the circuit leading to the output modulator and carrying modulating voltage, includes a dynamic control device which increases, with increasing amplitude of the information signals to be transmitted, the ratio between the modulation index of the signal fed to the limiter stage and the modulating voltage applied to the output modulator. For optimum suppression of the frequency components located outside the relevant signal band, the dynamic control device exhibits a dynamic control characteristics which increases the ratio between the modulation index of the signal applied to the limiter stage and the modulating voltage applied to the output modulator substantially by a factor of $(1+a^2)$ if the information signals to be transmitted have an amplitude $a$.

As is well known, the term "modulation index" is to be understood to mean the ratio between the amplitude of the envelope of the signal applied to the limiter stage and the amplitude of the carrier oscillation.

In order that the invention may be readily carried into effect, it will now be described in detail, by way of example, with reference to the accompanying diagrammatic drawing, in which.

Figure 1:
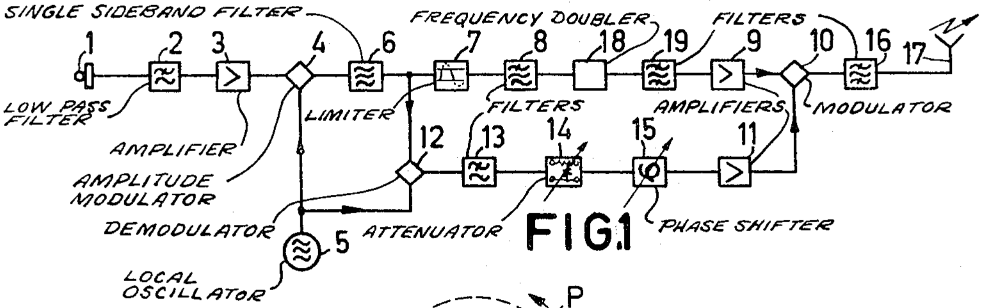
FIGURE 1 is a block diagram of an arrangement according to the invention.

In the transmitting arrangement according to the invention shown in FIGURE 1, for the transmission of music or speech signals located in the band of from 30 to 9000 c./s. signals originating from a microphone 1 are applied through a low-pass filter 2 and a low-frequency amplifier 3 to a modulator stage 4 and a carrier wave oscillator 5 of, for example, 400 kc./s. The upper sideband located in the band of from 400,030 to 409 kc./s. is derived, together with the carrier oscillation, from the output circuit of the amplitude modulator stage 4 with the use of a filter 6.

Figure 2A:
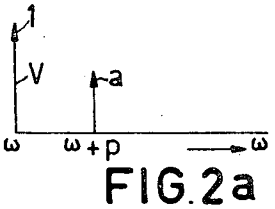
FIGURE 2 shows several diagrams to explain the arrangement according to the invention.

If, in the arrangement shown, for example a single sinusoidal oscillation of frequency $p$ is transmitted, the speech band $(\omega+p)$ occurs at the output of the modulator stage in addition to the transmitted carrier oscillation V of frequency $\omega$, which oscillations are shown in the frequency diagram of FIGURE 2*a*. In this frequency diagram the amplitude of the carrier oscillation is reduced to a value 1 and the speech sideband has an amplitude $a$ which, in order to avoid excess modulation, must be smaller than the amplitude 1 of the carrier wave.

Figure 2B:
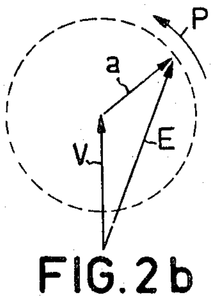

The described single sideband transmission with the cotransmitted carrier oscillation affords, as compared with ordinary amplitude modulation, the advantages that, with the transmitting power unchanged, the power of the information signals may be considerably increased, thus obtaining a saving in frequency, but this is offset by the fact that the oscillations emitted by the transmitting device, when received in an ordinary amplitude modulation receiver, show considerable signal distortion as will now be explained more fully with reference to the vector diagram shown in FIGURE 2*b*.

Figure 2C:
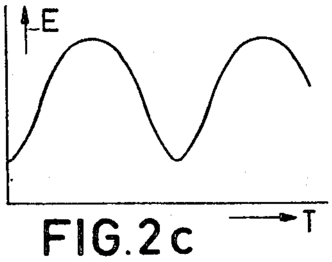
Figure 2D:
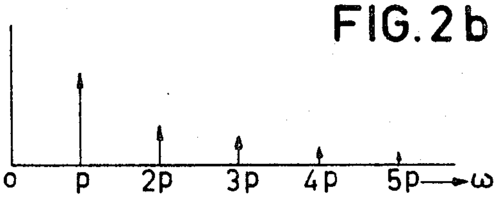

In this figure the vector V shows, as before, the carrier oscillation about which the sinusoidal speech frequency of amplitude *a* is rotating with a frequency *p*, whilst the sum vector E of these vectors describes the envelope of the emitted oscillation which, as may be seen from the time diagram of FIGURE 2*c*, no longer varies sinusoidally so that, upon detection of this envelope in an ordinary amplitude modulation receiver, distortion products will occur in addition to the desired frequency *p*.

More particularly the envelope is represented in mathematic form by the formula:

$$E=\sqrt{(1+a\cos pt)^2+a^2\sin^2 pt}$$

or when developed in a series:

$$E=(1+\tfrac{1}{4}a^2+\tfrac{1}{64}+\ldots)+(a-\tfrac{1}{8}a^3-\tfrac{1}{64}a^5-\ldots)\cos pt+(-\tfrac{1}{4}a^2+\tfrac{1}{16}a^4-\ldots)\cos 2pt+(\tfrac{1}{8}a^3-\tfrac{5}{64}a^5-\ldots)\cos 3pt, \text{ etc.}$$

Thus, upon transmission of the frequency spectrum shown in FIGURE 2*a*, the distortion products cos 2*pt*, cos 3*pt* . . . , etc., occur, in addition to the desired information component a cos *pt*, at the output of an ordinary amplitude modulation receiver. These distortion products will increase progressively with increasing amplitude *a* of the information component. For example, with a maximum amplitude *a* of the information component equal to 0.7 part of the amplitude of the carrier wave, the total distortion level is 17% relative to the carrier level corresponding to —15db.

If the information signal includes a plurality of frequency components, as is usually the case with music and speech signals, for example, if the information signal includes, in addition to the components *p*, the frequency component *q*, then interference products of frequencies *p+q*, *p—q*, 2*p+q*, 2*p—q* . . . , etc., will occur in addition to the harmonics of each of the components *p* and *q*. The total distortion level, which is composed of the level of the harmonic distortions 2*p*, 2*q*, etc., and the level of the interference products *p+q*, *p—q*, etc., relative to the level of the carrier, is —14 db with a modulation depth of 0.7 and relatively equal levels of the speech components *p* and *q*.

In order to reduce this distortion which occurs upon detection of the single sideband signal is an ordinary amplitude modulation receiver, it has previously been suggested to replace the envelope of the signal sideband signal by the original low-frequency signal to be transmitted, since detection in an amplitude modulation receiver provides the envelope of the signal thus transmitted, which now corresponds in waveform to the original low-frequency signal to be transmitted. For this purpose the single sideband signal derived from the output of the filter 6 is limited to a constant value in an amplitude limiter 7 having an output filter 8 and applied as a carrier oscillation through an amplifier 9 to an output modulator 10 to which the original signal to be transmitted is also applied through a modulation amplifier 11. In the embodiment described, the modulation voltage for the amplitude modulator is obtained by demodulating the single side band signal derived from the output of the filter 6 in a single sideband demodulator 12 with an output filter 13, which is connected to the local oscillator 5, and feeding the resulting low-frequency signal to the modulation amplifier 11 through an adjustable attenuator 14 and an adjustable phase-shifting network 15. The output signal from the output modulator 10 is emitted through an output filter 16 by a transmitting aerial 17.

The fact that the envelope of the single sideband signal derived from the filter 6 (FIGURE 2*c*) differs in waveform from the original low-frequency signal causes the frequency spectrum emitted by the transmitting aerial 17 to be likewise different from the frequency spectrum of the single sideband signal. If, for example, the single sideband signal has a frequency diagram as shown in FIGURE 2*a*, the replacement of the envelope of the single sideband signal (FIGURE 2*a* in the output modulator 10 by the original low-frequency signal provides the frequency spectrum shown in FIGURE 2*e*

Figures 2E, 3:
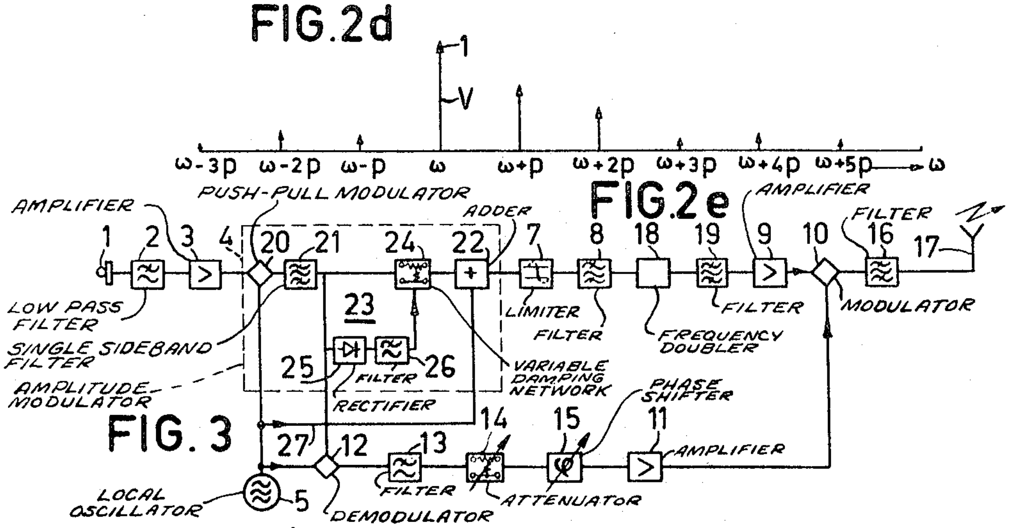
FIGURE 3 shows a further improvement of the arrangement according to the invention.

The components of the frequency spectrum shown in FIGURE 2*e* determine together the output signal of the output modulator 10 and the enveloping signal which varies in accordance with the original low-frequency signal, so that the original low-frequency signal will be faithfully restored upon reception of all of the components of the frequency spectrum in an ordinary amplitude modulation receiver. If, however, certain components of the frequency spectrum occurring at the output of the output modulator 10 are suppressed in the output filter 16 of the modulator stage or in the filters of the amplitude modulation receiver, distortion occurs upon amplitude demodulation to an extent which is determined by the level of the suppressed components of the spectrum.

Because of the unsurveyable character of this distortion since the various components of the spectrum depend upon the amplitude of the low-frequency signal in a mathematically complicated manner, more particularly each component of the spectrum being found to be given by series of Bessel functions, the various components of the spectrum have been numerically computed with the aid of electronic computers of the analog type in order to learn about the character of this distortion. It has been ascertained that, due to the replacement of the envelope of the single sideband signal by the original low-frequency signal, the higher components in the frequency spectrum occurring at the output of the output modulator 10 decrease only comparatively slowly. For example, spectrum components were still found to occur with an amplitude of several percent of the frequency of the transmitted carrier at a frequency distance from the carrier frequency V equal to several times the bandwith of the single sideband signal, so that only the very low frequencies are reproduced in an ordinary amplitude modulation receiver without distortion, since all of the components of the spectrum are passed by the filters only for these frequencies.

According to the invention the components in the frequency spectrum which fall outside the pass band of the output filter 16 of the transmitter or the filters of the receiver as considerably reduced in a surprisingly simple manner by arranging a frequency doubler 18 between the limiter 7 and the output modulator 10, followed by an output filter 19 which passes only the signal band of twice the carrier oscillation of the signals fed to the amplitude limiter 7. The oscillations derived from the frequency doubler 18 are amplitude modulated in the output modulator 10 as carrier oscillations by the original low-frequency signal in a similar manner as explained hereinbefore, the pass band of the output filter 16 in the output modulator 10 now being brought to twice the carrier frequency of the signals fed to the limiter stage 7.

The applicant has found with the described arrangement that two effects are realized in combination by the very frequency doubling of the oscillation derived from the limiter 7. First, this step caused the level of the spectrum components in the output circuit of the output modulator 10 which are located outside the pass band of the output filter 16 or of the filters in the receiver to be reduced to a minimum, for example by 30 to 40 db, resulting in the distortion level, upon reception in an amplitude modulation receiver of the usual quality, to be completely determined by the natural distortion of the receiver, which is, for example, —35 db. At the same time the character of the frequency spectrum was found to have changed so that the higher components of the spectrum completely disappear at one side of the single sideband signal and decrease according to a greatly converging series at the other side thereof, so that with conventional output filters of the output modulator the interference level in adjacent frequency bands fulfills the requirements imposed for ordinary amplitude modulation transmitters.

These two advantages, namely a minimum distortion level upon reception by ordinary amplitude modulation receivers and a low interference level in adjacent frequency bands is obtained with the surprisingly simple step according to the invention, makes the use of the described arrangement very attractive. It has even been found possible further to reduce the distortion level and the interference level in adjacent frequency bands, as will now be explained more fully with reference to FIGURE 3. Elements corresponding to FIGURE 1 are provided with the same reference numerals.

In the arrangement of FIGURE 3 the amplitude modulator 4 includes, in order to produce the single sideband signal and the cotransmitted carrier wave, a push-pull modulator 20 which operates with suppression of the carrier wave, followed by a single sideband filter 21 for separately producing the signal sideband and an adder stage 22 for adding the carrier oscillation through a carrier lead 27 to the single sideband. The resulting single sideband signal with the cotransmitted carrier oscillation, after being limited in the limiter 7 and doubled in frequency in the frequency doubler 18 is fed in the manner previously described with reference to FIGURE 1, as a carrier oscillation, to the output modultaor 10 to which the original low-frequency signal is also applied as a modulation voltage through the modulation amplifier 11.

In order further to reduce in this arrangement the unwanted frequency components located outside the signal band, the circuit of the amplitude modulator 4 includes a dynamic control device 23 which causes an increase in modulation index upon increasing amplitude of the signal, that is to say an increase in the ratio between the amplitude of the envelope and the amplitude of the carrier oscillation. The dynamic control device 23 is constituted by a dynamic control 24, which has the form of a variable damping network, a dynamic voltage rectifier 25 and an associated smoothing filter 26 for producing the dynamic control voltage for control of the dynamic control device 23 as a function of the amplitude $a$ of the signal, the dynamic control characteristic being proportioned so as to vary in line with the signal amplitude $a$ in accordance with the function $(1+a^2)$.

Figure 4:
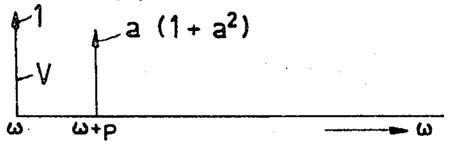
FIGURE 4 shows a frequency diagram which serves to explain the arrangement of FIGURE 3.

So, while in the arrangement of FIGURE 1 the ratio between the modulation index of the single sideband signal applied to the limiter 7 and the magnitude of the information signal has a constant value irrespectively of its amplitude, this ratio is no longer constant in the arrangement of FIGURE 3, but rather increases in accordance with the function $(1+a^2)$ with increasing amplitude $a$ of the information signal. If, for example, as in the arrangement of FIGURE 1, an input signal of frequency $p$ and amplitude $a$ is applied, a single sideband signal having the frequency spectrum of FIGURE 4 occurs at the input of the limiter 7, which frequency spectrum differs from that of FIGURE 2$a$ in that the amplitude value $a$ is replaced by the amplitude $a\ (1+a^2)$. In the manner described with reference to FIGURE 1, the resulting single sideband signal, after being limited in the limiter 7, and doubled in frequency in the frequency doubler 18, is amplitude modulated as a carrier oscillation by the original low-frequency signal in the output modulator 10.

The two effects obtained with the arrangement of FIGURE 1, more particularly the reduction in the level of the spectrum components outside the pass band of the output filter 16 or of the filters in the receiver, together with the convergence of these spectrum components, are still considerably intensified by these steps. In fact, it is found that, due to the increase in modulation index by the factor of $(1+a^2)$ by means of the dynamic control device 23, the very functional correlation of the spectrum components of the limited and frequency-doubled single sideband signal to the amplitude $a$ of the original signal is obtained so that, due to the modulating process in the output modulator 10, the two above-mentioned effects occur simultaneously as may be proved by calculation and experimentally. In practice, the unwanted components of the spectrum located outside the signal band are found to be completely suppressed, for example, by more than 50 db at a modulation depth less than 80%.

Instead of increasing the modulation index by dynamic increase in the signal sideband by the factor of $(1+a^2)$, the dynamic control may be included in the carrier lead 27 for controlling the amplitude of the carrier wave in inverse relationship to the factor of $(1+a^2)$ since the ratio between the sideband of the signal and the amplitude of the carrier wave, and hence the modulation index has remained unchanged all the same. Apart from the manner described hereinbefore, the envisaged object may be attained by including the dynamic control device in the circuit leading to the output modulator 10 and carrying modulation voltage.

Characteristic of all these embodiments is that at least one of the circuits formed respectively by the circuit leading to the limiter 7 and the circuit leading to the output modulator 10 and carrying modulation voltage includes a dynamic control device which increases the ratio between the modulation index of the signal applied to the limiter 7 and the modulation voltage of the output modulator 10 with increasing amplitude of the signal to be transmitted. Of all these embodiments the one with the dynamic control device included in the circuit of the amplitude modulator 4 is preferred in technical respect since, on the one hand, the equipment employed is very simple in structure and design and, on the other hand as compared with the dynamic control device included in the circuit leading to the output modulator 10 and carrying the modulation voltage, the quality of transmission when listening with an ordinary amplitude modulation receiver is considerably improved since no action occurs from the envelope of the signals emitted by the transmitting aerial 17, which is recovered upon amplitude demodulation.

In conclusion, it is to be noted that the dynamic control device may be designed in various ways. For example it is possible to use therefore transistors or tubes of variable transconductance, variable damping resistors in the form of rectifiers or the like.

What is claimed is:

1. A transmitting arrangement for the transmission of modulated oscillation wherein the information content is concentrated substantially in a single sideband, the transmitting arrangement comprising a first amplitude modulator fed by the signals to be transmitted and an associated carrier wave oscillator, means for deriving the carrier oscillation and only one of the sidebands from said amplitude modulator, first circuit means for applying said derived signals to an amplitude limiter, means applying the output signals of constant amplitude originating from the amplitude limiter to an output modulator as a carrier oscillation, and second circuit means for applying said signals to be transmitted to said output modulator as a modulation signal, wherein the improvement comprises a frequency doubler, means connecting said doubler to the output of the limiter, an output filter which passes only the signal band of twice the carrier oscillation of the signals applied to the amplitude limiter connected to apply the output of said limiter to said output modulator, and a dynamic control device for increasing the ratio between the modulation index of the signal applied to the limiter and the modulation voltage of the output modulator with increasing amplitude of the signal.

2. A transmitting arrangement as claimed in claim 1, wherein the dynamic control device has a dynamic control characteristic which varies with increasing amplitude $a$ of the signal, the ratio between the modultaion index of the signal applied to the limiter and the modulation voltage of the output modulator being substantially $(1+a^2)$.

3. A transmitting arrangement as claimed in claim 1, characterized in that the first amplitude modulator is constituted by a push-pull modulator, followed by a single sideband filter for separately producing the signal sideband and an adder stage for adding the carrier wave to the sideband of the signal, the sideband being applied to a rectifier and a subsequent low-pass filter for producing the direct dynamic control voltage which controls said dynamic control device.

References Cited

UNITED STATES PATENTS

| | | | |
|---|---|---|---|
| 2,989,707 | 6/1961 | Kahn | 332—45 |
| 3,012,209 | 12/1961 | Kahn | 332—37 |
| 3,295,072 | 12/1966 | Van Kessel | 332—41 |

ROBERT L. GRIFFIN, *Primary Examiner.*

BENEDICT V. SAFOUREK, *Assistant Examiner.*

U.S. Cl. X.R.

332—37, 45